United States Patent
Xue et al.

(10) Patent No.: US 8,365,227 B2
(45) Date of Patent: Jan. 29, 2013

(54) METHODS AND SYSTEMS FOR ONLINE RECOMMENDATION

(75) Inventors: Ya Xue, Niskayuna, NY (US); Abha Moitra, Scotia, NY (US); Steven Matt Gustafson, Niskayuna, NY (US)

(73) Assignee: NBCUniversal Media, LLC, New York, NY (US)

( * ) Notice: Subject to any disclaimer, the term of this patent is extended or adjusted under 35 U.S.C. 154(b) by 331 days.

(21) Appl. No.: 12/629,345

(22) Filed: Dec. 2, 2009

(65) Prior Publication Data

US 2011/0131595 A1    Jun. 2, 2011

(51) Int. Cl.
*G06F 3/00* (2006.01)
*G06F 13/00* (2006.01)
*H04N 5/445* (2006.01)
*H04N 7/16* (2006.01)
*H04H 60/33* (2008.01)

(52) U.S. Cl. ............................ 725/46; 725/9
(58) Field of Classification Search ........................ 725/9
See application file for complete search history.

(56) References Cited

U.S. PATENT DOCUMENTS

| | | |
|---|---|---|
| 2006/0059260 A1 | 3/2006 | Kelly et al. |
| 2006/0112408 A1* | 5/2006 | Crew et al. ............... 725/45 |
| 2007/0078849 A1 | 4/2007 | Slothouber |
| 2009/0187944 A1 | 7/2009 | White et al. |

* cited by examiner

*Primary Examiner* — Bennett Ingvoldstad
(74) *Attorney, Agent, or Firm* — Fletcher Yoder, P.C.

(57) ABSTRACT

A method for recommending videos is presented. The method includes generating a cross-usage matrix based upon a data of video sessions for a plurality of videos, generating a temporal matrix based upon release dates of the plurality of videos, generating a cross-temporal matrix based upon the cross-usage matrix and the temporal matrix, computing a global video rank corresponding to each of the plurality of videos based upon the cross-temporal matrix, generating a similarity score corresponding to each pair of videos in the plurality of videos based upon meta-data of the plurality of videos, and generating a local video rank corresponding to each of the plurality of videos relative to another video in the plurality of videos based upon the generated cross-usage matrix, the computed global video rank and the generated similarity score.

16 Claims, 4 Drawing Sheets

METHODS AND SYSTEMS FOR ONLINE RECOMMENDATION

BACKGROUND

A recommendation system may typically be a tool used by websites to facilitate its users in locating targeted artifacts, such as, articles, music, movies or products. A sub-category of the recommendation system may include video recommendation systems. Typically, a video recommendation system may be a tool used by websites to facilitate users in locating targeted online videos, or online videos that may be of interest. Typically, video recommendation systems predict users' ratings for unseen online videos and then recommend the unseen online videos with the highest predicted users' ratings.

In the past few years, consumption of the online videos has substantially increased leading to popularity of the video recommendation systems. One of the applications of video recommendation systems may be online TV. Online TV may be defined as a supplement to traditional broadcast/cable TV. Particularly, online TV may enable users to watch online a show, a soap, a serial or a game broadcasted by the TV networks. Online TV may also enable users to watch 'online-only content,' such as, "Deleted Scenes" or "Highlights."

Furthermore, while increased consumption of the online videos leads to popularity of video recommendation systems, it also results in increased number of challenges due to features and properties of the online videos. The features or properties of the online videos are weak indicators of users' interests and preferences and thus, require specialized processes and techniques for recommending the online videos. The features or properties of the videos, for example, may include significant size of video data compared to size of text or image data, low-level visual features, lack of textual matter, and the like.

Moreover, common video recommendation systems are either not employed to the online TV or only do simple online video recommendations based on meta-data or usage statistics. Furthermore, recommendation systems or video recommendation systems typically do not consider factors that significantly impact online video recommendations of TV shows. For example, the factors may include high-quality studio production of videos, short time horizon of the shows or soaps, temporal effects of the shows, and the like. The temporal effects, for example, may be an impact on interests of users due to releasing date, releasing time and time period elapsed from the release date of videos, shows or soaps. For example, a show A released recently may be of more interest to users than a show B that was released one year ago.

Hence, it is highly desirable to develop methods and systems for recommending online TV shows, soaps, games, and the like. Further, it is desirable to develop methods and systems that may address needs of the online TV networks.

BRIEF DESCRIPTION

Embodiments of the invention relate generally to a field of online recommendation, and more specifically to video recommendation methods and systems.

Briefly in accordance with one aspect of the technique, a method for recommending videos is presented. The method includes generating a cross-usage matrix based upon a data of video sessions for a plurality of videos, generating a temporal matrix based upon release dates of the plurality of videos, generating a cross-temporal matrix based upon the cross-usage matrix and the temporal matrix, computing a global video rank corresponding to each of the plurality of videos based upon the cross-temporal matrix, generating a similarity score corresponding to each pair of videos in the plurality of videos based upon meta-data of the plurality of videos, and generating a local video rank corresponding to each of the plurality of videos relative to another video in the plurality of videos based upon the generated cross-usage matrix, the computed global video rank and the generated similarity score.

In accordance with another aspect of the present technique, a system for recommending videos is presented. The system includes a plurality of workstations operationally coupled with a network, and configured to display videos and video recommendations to end users, a plurality of processing subsystems operationally coupled with the plurality of workstations via the network, wherein each of the plurality of processing subsystems is configured to generate a cross-usage matrix based upon data of video sessions of a plurality of videos, generate a temporal matrix based upon release dates of the plurality of videos, generate a cross-temporal matrix based upon the cross-usage matrix and the temporal matrix, compute a global video rank for each of the plurality of videos based upon the cross-temporal matrix, generate a similarity score corresponding to each pair of videos in the plurality of videos based upon meta-data of the plurality of videos, and generate a local video rank for each of the plurality of videos relative to another video in the plurality of videos based upon the generated cross-usage matrix, the computed global video rank and the generated similarity score

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
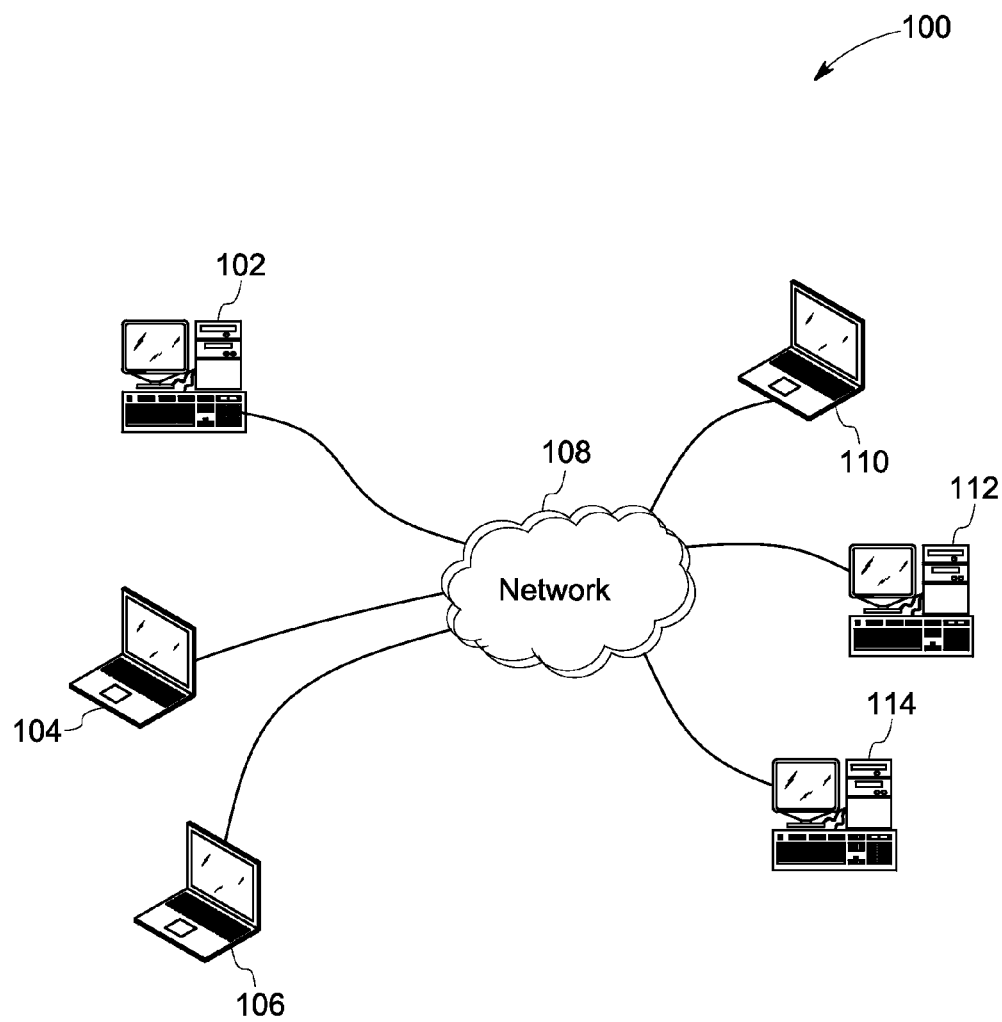
FIG. 1 is a diagrammatic illustration of an exemplary system for recommending videos, in accordance with aspects of the present technique.

Referring to FIG. 1, a diagrammatic illustration of an exemplary system 100 for recommending videos, in accordance with aspects of the present technique, is depicted. Although the present technique is described for recommending videos, it may be noted that the present technique may also facilitate recommendation of audio files, textual matter, games, user submitted content, commercials, advertisements, and the like. Further, as shown in a presently contemplated configuration of FIG. 1, the system 100 may include multiple workstations 102, 104, 106 of users operationally coupled with a network 108. In one embodiment, the multiple workstations 102, 104, 106 may be configured to display videos and video recommendations. As used herein, the term "video recommendation" may be used to refer to predicted videos that may be of interest, preference or priority to users.

Additionally, in certain embodiments, each of the multiple workstations 102, 104, 106 may display the video recommendations based upon a corresponding video recommendation list. As used herein, the term "video recommendation list" may be used to refer to a list of videos ranked in ascending or descending order of predicted priority, preference or interest of users. In certain embodiments, one or more of the multiple workstations 102, 104, 106 may receive the video recommendation list from a multiple processing subsystems 110, 112, 114. Further, in one embodiment, the one or more of the multiple workstations 102, 104, 106 may receive a single video recommendation list from the processing subsystems 110, 112, 114. In another embodiment, the one or more of the workstations 102, 104, 106 may receive different video recommendation lists from the processing subsystems 110, 112, 114.

Moreover, as shown in the presently contemplated configuration of FIG. 1, the processing subsystems 110, 112, 114 may be operationally coupled with the workstations 102, 104, 106 via the network 108. In certain embodiments, each of the processing subsystems 110, 112, 114 may be configured to generate the video recommendation list. More particularly, the processing subsystems 110, 112, 114 may be configured to generate the video recommendation list based upon local video ranks corresponding to a multiple videos. In one embodiment, the videos may include all videos in a website, videos existing and released in the website in a determined time period, videos released in the determined time period, videos existing in the determined time period, and the like. Furthermore, as used herein, the term "local video rank" may be used to refer to a rank or weight assigned to a link between videos based upon local connectivity of the videos. Particularly, the term "local video rank" may be used to refer to a weight assigned to a link between videos based upon connectivity of the videos to neighbour videos. More particularly, the term "local video rank" may be used to refer to a reweighted global video rank, specific to a video based upon connectivity of the video to neighbor videos. In certain embodiments, the local video ranks corresponding to the videos may be determined relative to another video in the videos.

Furthermore, the local video ranks corresponding to the videos may be determined based upon a cross-usage matrix, a global video rank and a similarity score of the videos. More particularly, a local video rank corresponding to a video relative to another video may be generated based upon an entry corresponding to the video relative to the another video in the cross-usage matrix, a corresponding global video rank and a similarity score of the video relative to the another video. As used herein, the term "cross-usage matrix" may be used to refer to a matrix that shows traffic links between videos. Particularly, the term "cross-usage matrix" may be used to refer to a matrix that shows traffic links between a pair of videos. Further, as used herein, the term "global video rank" may be used to refer to a weight assigned to a link of videos based upon traffic and release dates of the videos. In addition, as used herein, the term "similarity score" may be used to refer to a value assigned to a pair of videos based upon number of similar keywords associated with the pair of videos. The generation of the video recommendation list, the local video rank, the cross-usage matrix, the global video rank and the similarity score will be described in greater detail with reference to FIG. 2.

Figure 2:
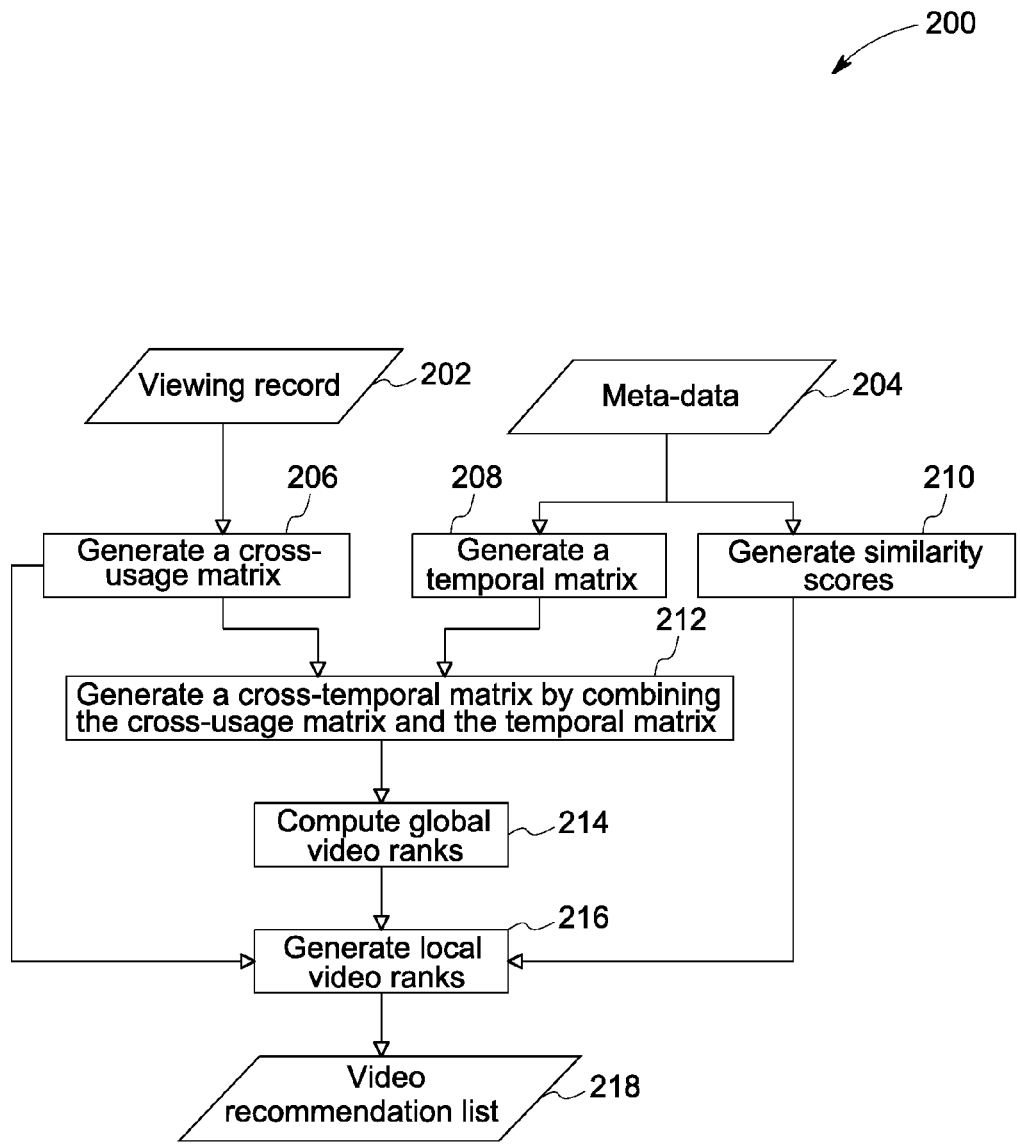
FIG. 2 is a flow chart for generating a recommendation list, in accordance with aspects of the present technique.

Referring now to FIG. 2, a flow chart 200 for generating a recommendation list, in accordance with aspects of the present technique, is depicted. Although the present technique is described for recommendation of videos, it may be noted that the present technique may also facilitate recommendation of audio files, textual matter, user submitted content, commercials, advertisements, games, online TV shows, and the like. As illustrated in FIG. 2, reference numeral 202 may be representative of a viewing record, while reference numeral 204 may be representative of meta-data. As used herein, the term "viewing record" may be used to refer to a record or a history of a website usage by users. The viewing record, for example, may include record or history of a website usage by users with respect to the media, such as, videos. More particularly, the term "viewing record" may be used to refer to traffic data and other associated data of a website usage. In an exemplary embodiment, the viewing record 202 may include records or history, such as, but not limited to record of users' sessions, time period of each session, sequence of videos visited by users, and the like. The user sessions, for example, may include activity details of a user, such as, viewing of videos, audios, textual files on a website during a period of time. In certain embodiments, the viewing record 202 may be collected for a determined time period. For example, a viewing record $V_1$ collected for the determined time period having sessions $S_1$, $S_2$, and $S_3$ may include traffic information data, time period of a session, location of sessions, and the like.

In a non-limiting example, if $v_1$, $v_2$, $v_3$, $v_4$ $v_5$, and $v_6$ are representative of videos, $t_1$, $t_2$, $t_4$, $t_7$ and $t_9$ are representative of textual matter, and $m_5$ and $m_6$ are representative of music files visited by users in the sessions $S_1$, $S_2$, and $S_3$, then the session $S_1$ may include traffic information data $v_1 \rightarrow v_2$, $v_2 \rightarrow v_3$, $v_3 + v_4$ for a time period between 3 p.m. to 4 p.m. at a location, Bangalore, India. Similarly, the session $S_2$ may include traffic information data $t_2 \rightarrow t_4$, $v_5 \rightarrow v_6$, $t_7 \rightarrow t_9$ for a time period 1 p.m. to 4 p.m. at a location New York, United States of America. Also, the session $S_3$ may include traffic information data $t_1 \rightarrow t_2$, $v_3 \rightarrow v_4$, $m_5 \rightarrow m_6$, time period: 12 a.m. to 2 a.m.; location: New York; United States of America.

Furthermore, in the present technique, the meta-data 204 may include data about videos, textual matter, music, artifacts, and the like. In an exemplary embodiment, the meta-data 204 may include keywords, such as, but not limited to video meta-data, such as, a director's name, actor/actress name, a show or movie name, a show's release date, genre of a show, year of release, telecast time, and the like. Similarly, the meta-data 204 may also include data, such as, size of a file, last modification date of a file, and the like. In one embodiment, the meta-data 204 may be extracted from names of pages in websites. In certain embodiments, the meta-data 204 may be extracted from internal databases, clickstream data from websites, public or non-public data sources that describe video and/or a user's likely interest in a video, such as, a social graph. It should be noted that, while in the present technique, the meta-data 204 is explained with reference to videos, the meta-data 204 may also be associated with other types of data including music files, textual matter, games, and the like.

The method continues with step 206, where a cross-usage matrix is generated. As previously noted with reference to FIG. 1, the term "cross-usage matrix" may be used to refer to a matrix showing traffic links between videos. Accordingly, the cross-usage matrix includes, for example, co-viewing of two or more videos by users of a website. In an exemplary embodiment, in a website $W_1$, if traffic links between videos $v_1$, $v_2$, $v_3$ and $v_4$ are $v_1 \rightarrow v_2$, $v_2 \rightarrow v_3$, $v_3 \rightarrow v_4$, then a cross-usage matrix $C_1$ may be represented as follows:

$$C_1 = \begin{vmatrix} 0 & 1 & 0 & 0 \\ 0 & 0 & 1 & 0 \\ 0 & 0 & 0 & 1 \\ 0 & 0 & 0 & 0 \end{vmatrix} \quad (1)$$

In certain embodiments, the cross-usage matrix may be generated based upon a data of video sessions. The data of video sessions, for example, may include traffic information data, time period of sessions, information of users, and the like. The generation of the cross-usage matrix may be better understood with reference to FIG. 3.

Figure 3:
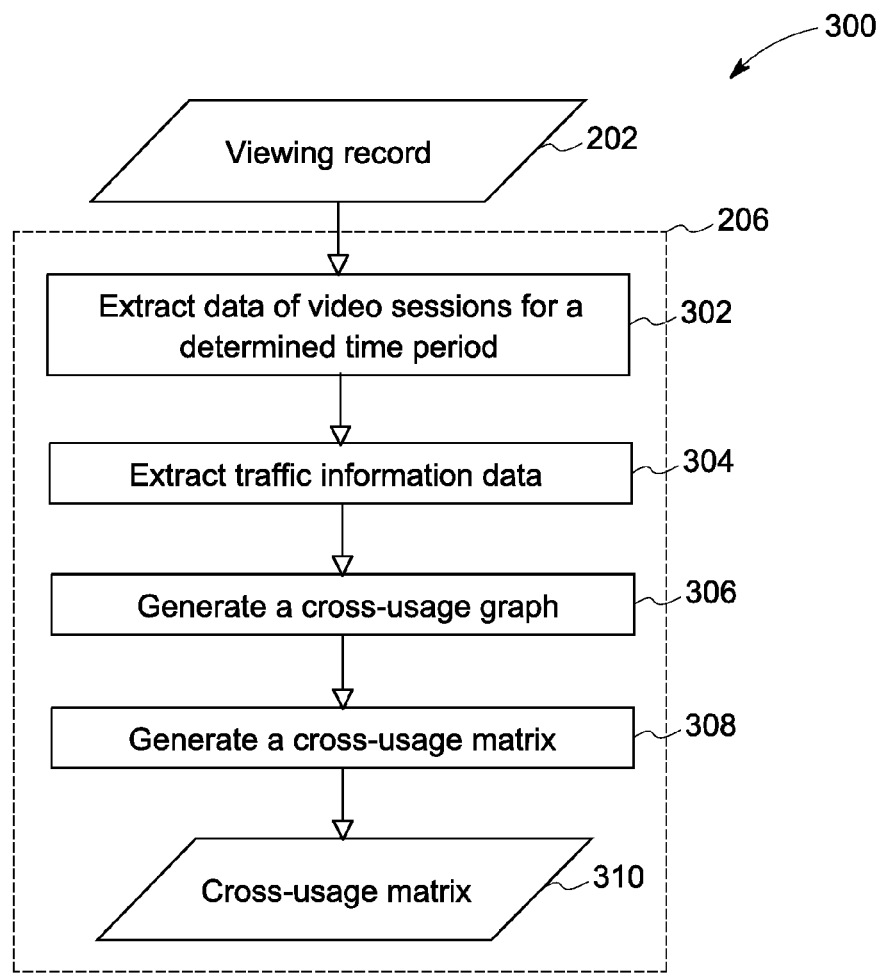
FIG. 3 is a flow chart illustrating an exemplary process of generating a cross-usage matrix, in accordance with aspects of the present technique.

Turning now to FIG. 3, a flow chart 300 illustrating an exemplary process of generating a cross-usage matrix, as in the step 206 of FIG. 2, in accordance with aspects of the present technique, is depicted. As previously noted with reference to FIG. 2, reference numeral 202 may be representative of the viewing record. The method continues with step 302, where data of video sessions may be extracted from the viewing record. As previously noted with reference to FIG. 2, the data of video sessions, for example, may include traffic information data, time period of sessions, information of users, and the like.

Furthermore, it should be noted that while in the present technique data of video sessions is extracted from the viewing record, in certain embodiments, sessions data associated with music files, textual matter, or combinations thereof may be extracted from the viewing record 202. In certain embodiments, the data of video sessions may be extracted by the multiple processing subsystems 110, 112, 114 (see FIG. 1). More particularly, the multiple processing subsystems 110, 112, 114 may extract the data of video sessions utilizing the RSS feeds. In one embodiment, the data of video sessions may be extracted based upon identification number and/or identification names of videos in sessions of a website.

Subsequently, as depicted by step 304, traffic information data may be extracted from the data of video sessions. The traffic information data, for example, may include co-viewing of two videos in a session. In an exemplary embodiment, if in a data of video sessions, a user moved from a video $v_1$ to a video $v_2$, then a traffic information data $T_1$ may be represented as $v_1 \rightarrow v_2$. Furthermore, in another exemplary embodiment, if there are five videos including $v_1, v_2, v_3, v_4$ and $v_5$, then traffic information data $T_2$ may be represented as $v_1 \rightarrow v_2, v_2 \rightarrow v_3, v_3 \rightarrow v_4, v_4 \rightarrow v_5$.

Subsequently to the extraction of the traffic information data at step 304, a cross-usage graph may be generated by step 306. The cross-usage graph, for example, includes a data structure graph where videos are represented as nodes. The nodes may be linked to one another based upon the traffic information data extracted by processing of the step 304. The cross-usage graph may be generated by connecting each video in the traffic information data to another video in the traffic information data having an incoming link from the video. For example, a cross-usage graph 320 may be generated based upon a traffic information data. The cross-usage graph 320 generated by processing of the step 306 is illustrated in FIG. 4.

Figure 4:
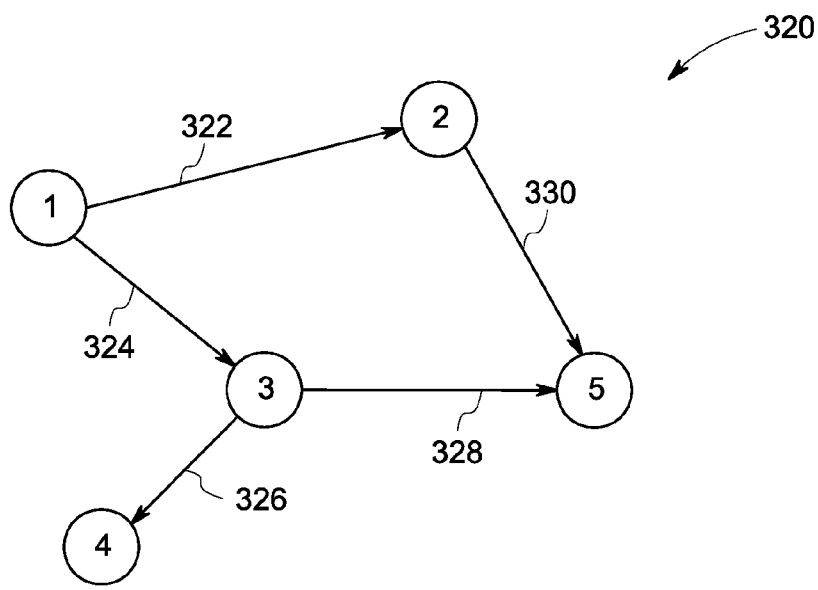
FIG. 4 is an exemplary cross-usage graph generated, in accordance with aspects of the present technique.

Referring now to FIG. 4, an exemplary cross-usage graph 320 generated by processing of the step 306 of FIG. 3, in accordance with aspects of the present technique, is depicted. As shown in FIG. 4, the cross-usage graph 320 includes nodes 1, 2, 3, 4 and 5. As noted with reference to FIG. 3, each node in a cross-usage graph is representative of a video. Accordingly, the nodes 1, 2, 3, 4 and 5 are representative of videos $v_1, v_2, v_3, v_4$ and $v_5$, respectively. Furthermore, as shown in FIG. 4, the video $v_1$ is linked to the videos $v_2$ and $v_3$ via links 322 and 324. The links 322, 324 from the video $v_1$ to the videos $v_2$ and $v_3$ implies traffic existing from the video $v_1$ to the videos $v_2$ and $v_3$. Similarly, a link 330 from the video $v_2$ to the video $v_5$ implies traffic from the video $v_2$ to the video $v_5$. Also, as shown in FIG. 4, links 326 and 328 from the video $v_3$ to the videos $v_4$ and $v_5$ implies traffic from the video $v_3$ to the videos $v_4$ and $v_5$, respectively.

Referring again to FIG. 3, at step 308, a cross-usage matrix 310 may be generated based upon the cross-usage graph generated at step 306. The cross-usage matrix 310, for example may be generated by the processing subsystems 110, 112, 114 (see FIG. 1). In an exemplary embodiment, the cross-usage matrix 310 may include a cross-usage matrix $C_2$ generated based upon the cross-usage graph 320 in FIG. 4. The cross-usage matrix $C_2$ may be represented as follows:

$$C_2 = \begin{vmatrix} 0 & 1 & 1 & 0 & 0 \\ 0 & 0 & 0 & 0 & 1 \\ 0 & 0 & 0 & 1 & 1 \\ 0 & 0 & 0 & 0 & 0 \\ 0 & 0 & 0 & 0 & 0 \end{vmatrix} \qquad (2)$$

Referring again to FIG. 2, subsequent to the processing of the step 206, a cross-usage matrix 310 (see FIG. 3) may be generated. Concurrently, a temporal matrix may also be generated based upon release dates of the videos. As used herein, the term "temporal matrix" may be used to refer to a matrix of weights corresponding to videos where the weights are assigned to the videos based upon release dates of the videos. Moreover, in certain embodiments, a video is assigned a weight based upon difference between date of release of the video and current date of generation of the temporal matrix. In certain embodiments, the release dates of the videos may be extracted from the meta-data 204. The release dates, for example, may be extracted utilizing identification numbers and/or identification names of the videos. In an exemplary embodiment, the temporal matrix may include newly released videos in columns and existing videos in rows.

Further, in certain embodiments, the temporal matrix corresponding to the videos may be generated by the processing subsystems 110, 112, 114. In an exemplary embodiment, a temporal matrix B may be generated utilizing the following equation (3).

$$B = \beta^{t-t_{0j}} \qquad (3)$$

where β is a scalar value less than 1, t is a date of generation of the temporal matrix B or is a release date of a most recently or newly released video, j is an identification number of a video, and $t_{0j}$ is a release date of the video j. In one embodiment, the value of β may be 0.5. Furthermore, in certain embodiments, a temporal matrix B' may be determined by the following equation:

$$B' = \gamma \beta^{t-t_{0j}} \qquad (4)$$

where γ is a buzz multiple. In certain embodiments, the buzz multiple γ may facilitate stimulation of strength or effectiveness of the temporal matrix. For example, if $\beta^{t-t_{0j}}$ is multiplied to a higher value of the buzz multiple, the value of all entries in the temporal matrix will be greater. By way of an example, if there are five videos $v_1, v_2, v_3, v_4, v_5$ that are released on $2^{nd}$, $2^{nd}$, $7^{th}$, $9^{th}$ and $10^{th}$ day of a month, respectively. Further, in the example, if the temporal matrix is generated on $10^{th}$ day of the month, then the temporal matrix, such as, a temporal matrix B" may be represented as shown in equation (5).

$$B'' = \begin{vmatrix} 0 & 0 & \beta^3 & \beta^1 & \beta^0 \\ 0 & 0 & \beta^3 & \beta^1 & \beta^0 \\ 0 & 0 & 0 & \beta^1 & \beta^0 \\ 0 & 0 & 0 & 0 & \beta^0 \\ 0 & 0 & 0 & 0 & 0 \end{vmatrix} \qquad (5)$$

where the rows are representative of existing videos and the columns are representative of newly or recently released videos. In the above-mentioned temporal matrix B", since the first and second videos $v_1$ and $v_2$ are the earliest released videos and are released on same of the month, the first and second columns of the newly released videos $v_1$ and $v_2$ are assigned values equal to 0. However, when the third video $v_3$ is released on $7^{th}$ day of the month, the videos $v_1$ and $v_2$ have already been released on the $2^{nd}$ day of the month. Thus, in column three, rows corresponding to the videos $v_1$ and $v_2$ have been assigned values equal to $\beta^{10-7}$, resulting in $\beta^3$. Similarly, when the fourth video $v_4$ is released on $9^{th}$ day of the month, the first, the second and third videos $v_1$, $v_2$, $v_3$ have already been released. Thus, in the fourth column, the rows corresponding to the videos $v_1$, $v_2$, $v_3$ are assigned values equal to $\beta^{10-9}$, resulting in $\beta^1$.

The generation of the temporal matrix is shown at step 208, which may be generated concurrently with a similarity score at step 210 corresponding to each pair of videos in the videos based upon the meta-data 204. As previously noted with reference to FIG. 1, the term "similarity score" may be used to refer to a value assigned to a pair of videos based upon a number of similar keywords associated with the pair of videos. In one embodiment, a high similarity score corresponding to a pair of videos is representative of a high number of similar keywords between videos in the pair of videos. By way of example, if the videos includes videos $v_1$, $v_2$ and $v_3$. Further, if a number of similar keywords between videos a pair of the videos $v_1$ and $v_2$ is 5 and a number of similar keywords between videos in another pair of the videos $v_1$ and $v_3$ is 4. Then, a similarity score assigned to the pair of the videos $v_1$ and $v_2$ is greater than a similarity score assigned to the pair of the videos $v_1$ and $v_3$. The generation of the similarity score may be better understood with reference to FIG. 5.

Figure 5:
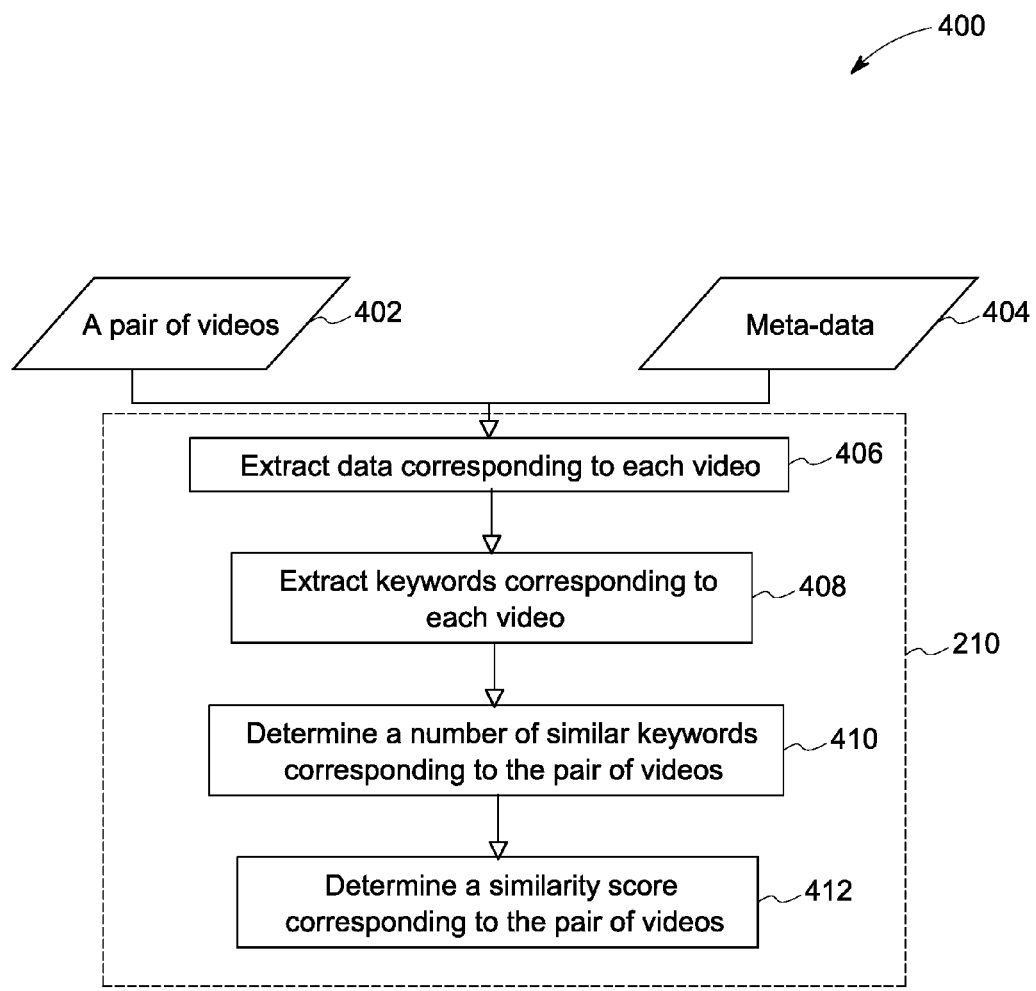
FIG. 5 is a flow chart illustrating an exemplary process of determining a similarity score corresponding to a pair of videos, in accordance with aspects of the present technique.

Referring now to FIG. 5, a flow chart 400 illustrating an exemplary process of determining a similarity score corresponding to two or more videos, as in the step 210 of FIG. 2, in accordance with aspects of the present technique, is depicted. While this example employs a pair of videos, the processing is the same with respect to a plurality of videos. As illustrated herein, reference numeral 402 may be representative of a pair of videos, while reference numeral 404 may be representative of a meta-data corresponding to the pair of videos 402. In an exemplary embodiment, the pair of videos 402 may be a subset of the videos referred to in FIG. 2. Thus, the meta-data 404 may be a subset of the meta-data 204 referred to in FIG. 2.

The method continues with step 406 where data corresponding to each video may be extracted from the meta-data 404. The data corresponding to each video, for example, may be extracted utilizing identification number and/or identification name of each video. It should be noted that while in the present technique, the data corresponding to each video is extracted from the meta-data 404, in certain embodiments, data corresponding to each video may also be extracted from page names of websites having the video.

At step 408, keywords corresponding to each video in the pair of videos may be extracted from the data. The keywords may be extracted by the processing subsystems 110, 112, 114 (see FIG. 1). In an exemplary embodiment, the keywords may be extracted by removing common prefixes, replacing punctuations marks by spaces, removal of common words, and the like from the data. The keywords corresponding to a video, for example, may include name, content, hosts, telecast time, event, event type, and the like. In a non-limiting example, keywords corresponding to a video naming "Late Night with Conan O'Brien: Conan the Answer Man" may include keywords, such as, "late night," "talk show," "highlights—september 2007," "late night with conan o'brien," and the like.

In addition, a number of similar keywords corresponding to the pair of videos may be determined at step 410. In an exemplary embodiment, the number of similar keywords corresponding to the pair of videos may be determined by keyword matching methods, such as, basic term co-occurrence or edit distance similarity method. Further, as indicated by step 412, a similarity score may be determined corresponding to the pair of videos. The similarity score may be determined based upon the number of similar keywords. In an exemplary embodiment, if a number of keywords in a first video is $K_1$, a number of keywords in a second video is $K_2$, and a number of similar keywords between the first video and the second video is $K_{12}$, then a similarity score $SI_{12}$ corresponding to the first and second videos may be determined by the following equation (6):

$$SI_{12} = \frac{K_{12}}{\sqrt{K_1 K_2}} \qquad (6)$$

Although the present technique is described by determining a similarity score corresponding to a pair of videos, the similarity score may also be determined corresponding to more than two videos.

With returning reference to FIG. 2, the processing of step 210 results in generation of the similarity score corresponding to the videos. Furthermore, as indicated by step 212, the cross-usage matrix generated at step 206 and the temporal matrix generated at 208 may be combined. In one embodiment, the combination of the cross-usage matrix, such as, the cross-usage matrix 310 (see FIG. 3) and the temporal matrix may result in a cross-temporal matrix. In an exemplary embodiment, the cross-temporal matrix may be generated by determining a first matrix and a second matrix, followed by adding the second matrix to the third matrix. The first matrix, for example, may be determined by subtracting the temporal matrix from a matrix of ones. Further, the second matrix may be determined by multiplying the first matrix with the cross-usage matrix. Also, the cross-temporal matrix may be generated by adding the second matrix to the temporal matrix. Accordingly, in certain embodiments, the cross-temporal matrix, such as, a cross-temporal matrix CT may be represented as follows:

$$CT = [(I-B) \otimes C] + B \otimes Q \qquad (7)$$

where I is a matrix of ones, B is a temporal matrix and C is a cross-usage matrix, I–B is a first matrix, Q is a buzz matrix, $[(I-B) \otimes C]$ is a second matrix and $\otimes$ is an element-to-element multiplication. The buzz matrix Q may be determined using the following equation (8)

$$q_{ij} = \begin{cases} \gamma_j, & \text{if } i < j, \\ 0, & \text{otherwise.} \end{cases} \qquad (8)$$

where $q_{ij}$ is an element value for a row i and column j in the buzz matrix Q and $\gamma$ is a buzz multiple. Furthermore, in certain other embodiments, the cross-temporal matrix, such as, a cross-temporal matrix CT' may be generated as follows:

$$CT' = [(I-B) \otimes H] + B \otimes Q \qquad (9)$$

where H is a normalized cross-usage matrix, (I–B) is a first matrix, Q is a buzz matrix, $[(I-B) \otimes H]$ is a second matrix and $\otimes$ is an element-to-element multiplication. The normalized cross-usage matrix, for example, may be determined by dividing each entry in a row of the cross-usage matrix by a total of the value of entries in the row. For example, if a normalized cross-usage matrix $H_2$ corresponding to the cross-usage matrix $C_2$ of equation (2) is determined, then $H_2$ may be represented as follows:

$$H_2 = \begin{vmatrix} 0 & .5 & .5 & 0 & 0 \\ 0 & 0 & 0 & 0 & 1 \\ 0 & 0 & 0 & .5 & .5 \\ 0 & 0 & 0 & 0 & 0 \\ 0 & 0 & 0 & 0 & 0 \end{vmatrix} \quad (10)$$

Furthermore, in certain embodiments, the cross-temporal matrix may be used to generate a normalized cross-temporal matrix. The normalized cross-temporal matrix, such as, a normalized cross-temporal matrix represented by CTH may be determined by dividing each entry in a row of the cross-temporal matrix by a total of the value of entries in the row. Subsequently, a global video rank corresponding to each of the videos may be computed at step 214. The global video, for example, may be computed based upon the normalized cross-temporal matrix. More particularly, a global video rank may be computed by applying methods, such as, a page rank method to the normalized cross-temporal matrix. In certain embodiments, methods including graph nearest neighbor, clustering, and the like may be applied to the normalized cross-temporal matrix for determination of the global video rank. Moreover, in certain embodiments, a global video rank $\pi_\infty$ may be determined as follows:

$$\lim_{k \to \infty} \pi_0 CTH^k = \pi_\infty \quad (11)$$

where CTH is a normalized cross-temporal matrix and k is a power. The normalized cross-temporal matrix CTH, for example, may be determined by dividing each entry in a row of the cross-temporal matrix by a total of the value of entries in the row. In certain other embodiments, the global rank may be determined as follows:

$$\lim_{k \to \infty} \pi_0 G^k = \pi_\infty \quad (12)$$

where G is determined as follows:

$$G = \alpha CTH + (1-\alpha)E \quad (13)$$

where $\alpha$ is a determined parameter, E is a matrix of all $1/n$, n is number of videos. In certain embodiments, the value of the determined parameter $\alpha$ may be less than 1. In an embodiment, the value of $\alpha$ may be 0.85.

In addition, as indicated by step 216, a local video rank corresponding to each of the videos relative to another video in the videos may be determined. As previously noted with reference to FIG. 1, the local video rank corresponding to another video may be determined based upon the generated cross-usage matrix, the computed global video rank and the generated similarity score. In one embodiment, a local video rank corresponding to a video i relative to another video j may be represented as follows:

$$R_{ij} = C_{ij}\pi_{\infty j} + \epsilon \rho^{S_{ij}} \quad (14)$$

where $C_{ij}$ is an entry in a cross-usage matrix C from a video i to a video j, $\pi_{\infty j}$ is a global video rank corresponding to the video j, $S_{ij}$ is a similarity score of a pair of videos i and j, $\rho$ is a scalar determined parameter, $\epsilon$ is a binary value to turn the similarity score $S_{ij}$ on or off. In one embodiment, the value of the scalar determined parameter $\rho$ may be greater than 1. Furthermore, subsequent to the processing of the step 216, the video recommendation list, such as, a video recommendation list 218 may be generated.

EXAMPLE

For illustrative purposes, one example is provided to show certain functionality of the present method and system. The data is artificially collected in this example for a certain time period and the results are analyzed using the present technique to demonstrate the functionality of the present technique.

One illustrative example relates to a method and system for recommending videos in a website. The website includes seven videos that are released from Sep. 10, 2008 to Sep. 17, 2008, as shown in Table 1. In this example, the method and system for recommending videos recommends videos at 12 a.m. on Sep. 17, 2008.

TABLE 1

| Video Number | Release Date | Video Name/Keywords |
|---|---|---|
| 1 | Sep. 10, 2008 | nbc2\|Primetime\|Americas Got Talent\|Show Clips\|Season 3 Highlights\|Neal E. Boyd |
| 2 | Sep. 11, 2008 | nbc2\|Primetime\|Americas Got Talent\|Show Clips\|Season 3 Highlights\|Sickstep |
| 3 | Sep. 12, 2008 | nbc2\|Daytime\|Days of our Lives\|Show Clips\|Highlights\|John's Jealousy (Sep. 12, 2008) |
| 4 | Sep. 13, 2008 | nbc2\|Late Night\|Tonight Show with Jay Leno\|Show Clips\|Highlights\|Jamie Lee Curtis walks off set! |
| 5 | Sep. 15, 2008 | nbc2\|Late Night\|Saturday Night Live\|Show Clips\|2000s\|Palin/Hillary Open |
| 6 | Sep. 16, 2008 | nbc2\|Late Night\|Saturday Night Live\|Behind the Scenes\|SNL Backstage\|SNL Backstage: Michael Phelps/Ti |
| 7 | Sep. 17, 2008 | nbc2\|Primetime\|The Biggest Loser Season 6\|Web Exclusives\|Where Are They Now?\|Week One |

Furthermore, viewing record for the seven videos is collected from Sep. 10, 2008 to Sep. 16, 2008. The collected viewing record is then processed to generate a cross-usage matrix C. The cross-usage matrix C may be generated using the technique explained with reference to FIG. 3. The cross-usage matrix C generated is shown in equation (15).

$$C = \begin{vmatrix} 0 & 22 & 1 & 0 & 20 & 0 & 0 \\ 22 & 0 & 0 & 0 & 2 & 0 & 0 \\ 1 & 0 & 0 & 2 & 5 & 0 & 0 \\ 0 & 0 & 2 & 0 & 109 & 0 & 0 \\ 20 & 2 & 5 & 109 & 0 & 383 & 0 \\ 0 & 0 & 0 & 0 & 383 & 0 & 0 \\ 0 & 0 & 0 & 0 & 0 & 0 & 0 \end{vmatrix} \quad (15)$$

In addition, the cross-usage matrix C in equation (15) may be used to determine a normalized cross-usage matrix H, as shown in equation (16).

$$H = \begin{vmatrix} 0 & .5116 & .0233 & 0 & .4651 & 0 & 0 \\ .9167 & 0 & 0 & 0 & .0833 & 0 & 0 \\ .125 & 0 & 0 & .25 & .625 & 0 & 0 \\ 0 & 0 & .018 & 0 & .982 & 0 & 0 \\ .0385 & .0039 & .0096 & .21 & 0 & .738 & 0 \\ 0 & 0 & 0 & 0 & 1 & 0 & 0 \\ 0 & 0 & 0 & 0 & 0 & 0 & 0 \end{vmatrix} \quad (16)$$

Furthermore, a temporal matrix B is generated by processing the data, such as, the video names and release dates of the seven videos in Table 1. The temporal matrix B is generated by the method described in step 208 with reference to FIG. 2. In the generation of this temporal matrix B, the value of buzz multiple γ is assumed as 1, and the scalar value β is assumed as 0.5. In this example, the temporal matrix is generated using the technique described in step 208 with reference to FIG. 2. The temporal matrix B is shown in equation (17).

$$B = \begin{vmatrix} 0 & .0156 & .0313 & .0625 & .25 & .5 & 1 \\ 0 & 0 & .0313 & .0625 & .25 & .5 & 1 \\ 0 & 0 & 0 & .0625 & .25 & .5 & 1 \\ 0 & 0 & 0 & 0 & .25 & .5 & 1 \\ 0 & 0 & 0 & 0 & 0 & .5 & 1 \\ 0 & 0 & 0 & 0 & 0 & 0 & 1 \\ 0 & 0 & 0 & 0 & 0 & 0 & 0 \end{vmatrix} \quad (17)$$

As described in step 212 of FIG. 2, the cross-usage matrix C and the temporal matrix B are combined to generate a cross-temporal matrix CT. The generated cross-temporal matrix is shown in equation (18).

$$CT = \begin{vmatrix} 0 & .5114 & .0382 & .0313 & .4738 & .25 & .5 \\ .9167 & 0 & .0516 & .0313 & .1875 & .25 & .5 \\ 0125 & 0 & 0 & .02656 & .5938 & .25 & .5 \\ 0 & 0 & .018 & 0 & .8615 & .25 & .5 \\ .0385 & .0039 & .0096 & .21 & 0 & .619 & .5 \\ 0 & 0 & 0 & 0 & 1 & 0 & .5 \\ 0 & 0 & 0 & 0 & 0 & 0 & 0 \end{vmatrix} \quad (18)$$

The cross-temporal matrix CT is normalized to generate a normalized cross-temporal matrix CTH. The normalized cross-temporal matrix is shown in equation (19).

$$CTH = \begin{vmatrix} 0 & .2834 & .0211 & .0173 & .2626 & .1385 & .2771 \\ .4822 & 0 & .0082 & .0164 & .0986 & .1315 & .263 \\ .0721 & 0 & 0 & .1532 & .3423 & .1441 & .2883 \\ 0 & 0 & .0111 & 0 & .5287 & .1534 & .3068 \\ .0279 & .0028 & .007 & .1521 & 0 & .4482 & .3621 \\ 0 & 0 & 0 & 0 & .6667 & 0 & .3333 \\ 0 & 0 & 0 & 0 & 0 & 0 & 0 \end{vmatrix} \quad (19)$$

Subsequent to the determination of the normalized cross-temporal matrix CTH, a similarity score corresponding to each pair of videos in the seven videos is computed. The similarity scores for the pairs of videos are computed based upon the keywords extracted corresponding to each video. The computed similarity score corresponding to each pair of videos is shown in a similarity score matrix S in equation (20).

$$S = \begin{vmatrix} 0 & .7217 & .1443 & .1066 & 0 & 0 & .1443 \\ .7217 & 0 & .1667 & .1231 & 0 & 0 & .1667 \\ .1443 & .1667 & 0 & .1231 & 0 & 0 & 0 \\ .1066 & .1231 & .1231 & 0 & .2132 & .1818 & 0 \\ 0 & 0 & 0 & .2132 & 0 & .4264 & 0 \\ 0 & 0 & 0 & .1818 & .4264 & 0 & 0 \\ .1443 & .1667 & 0 & 0 & 0 & 0 & 0 \end{vmatrix} \quad (20)$$

Furthermore, in this example a global video rank is computed corresponding to each of the seven videos by applying a page rank method on the normalized cross-temporal matrix CTH of equation (19). The ranks corresponding to all the videos are shown in Table 2.

TABLE 2

| Video Number | 1 | 2 | 3 | 4 | 5 | 6 | 7 |
|---|---|---|---|---|---|---|---|
| Global video rank | .0927 | .0754 | .0567 | .0936 | .242 | .1833 | .256 |

In Table 2, video 7 has the highest global video rank, and thus may be of highest interest to users. It should be noted that video 7 is the latest released video. The determination of global video rank is followed by determination of local video ranks corresponding to each video in the seven videos based upon the similarity scores in the similarity score matrix S, the cross-temporal matrix C and the global video ranks corresponding to the seven videos. The local video ranks are then used to generate a video recommendation list L as shown in Table 3.

TABLE 3

| User is Watching | 1st Recommendation | 2nd Recommendation. | 3rd Recommendation |
|---|---|---|---|
| 1 | 2 | 3 | 7 |
| 2 | 1 | 3 | 7 |
| 3 | 2 | 1 | 4 |
| 4 | 5 | 6 | 3 |
| 5 | 6 | 4 | 1 |
| 6 | 5 | 4 | 7 |
| 7 | 2 | 1 | 3 |

The methods and systems for online recommendations, as described herein above, may facilitate recommendation of online TV shows, soaps, games, and the like. Furthermore, the methods and systems for online recommendations may address needs of the online TV networks while recommending the online TV shows, soaps, games, and the like. The methods and systems may further consider properties of videos while recommending videos. The properties of videos that may be considered while recommending videos includes high-quality studio production of videos, short time horizon of the shows, or soaps while recommending the online TV shows, soaps, games, and the like.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A computer implemented method for recommending videos, comprising:
   generating, by a processing subsystem, a cross-usage matrix based upon a data of video sessions for a plurality of videos;
   generating, by the processing subsystem, a temporal matrix based upon release dates of the plurality of videos;
   generating, by the processing subsystem, a cross-temporal matrix based upon the cross-usage matrix and the temporal matrix;
   computing, by the processing subsystem, a global video rank corresponding to each of the plurality of videos based upon the cross-temporal matrix;
   generating, by the processing subsystem, a similarity score corresponding to a pair of videos in the plurality of videos based upon meta-data of the plurality of videos;
   generating, by the processing subsystem, a local video rank corresponding to a video of the plurality of videos relative to another video in the plurality of videos based upon the generated cross-usage matrix, the computed global video rank and the generated similarity score; and
   recommending, by the processing subsystem, a video to a user device based upon the local video rank.

2. The method of claim 1, wherein the data of video sessions comprises sessions of users on a website for a determined time period.

3. The method of claim 1, wherein generating the cross-usage matrix comprises:
   extracting the data of video sessions of the plurality of videos from a viewing record;
   extracting traffic information data from the data of video sessions;
   generating a cross-usage graph by connecting each video in the traffic information data to another video in the traffic information data having an incoming link from the video; and
   generating the cross-usage matrix based upon the cross-usage graph.

4. The method of claim 2, wherein the plurality of videos in the website comprise all videos in the website, a subset of videos in the website, videos existing and released in the website in the determined time period, videos released in the determined time period, and videos existing in the determined time period.

5. The method of claim 1, wherein temporal matrix comprises released videos in columns and existing videos in rows.

6. The method of claim 5, wherein the temporal matrix comprises entries greater than zero for all the existing videos released prior to a released video.

7. The method of claim 1, wherein generating the cross-temporal matrix comprises:
   determining a first matrix by subtracting the temporal matrix from a matrix of ones;
   determining a second matrix by multiplying the first matrix with the cross-usage matrix; and
   adding the second matrix to the temporal matrix resulting in the cross-temporal matrix.

8. The method of claim 1, wherein generating the cross-usage matrix further comprises determining a normalized cross-usage matrix.

9. The method of claim 8, wherein generating the cross-temporal matrix comprises:
   determining a first matrix by subtracting the temporal matrix from a matrix of ones;
   determining a second matrix by multiplying the first matrix with the normalized cross-usage matrix; and
   adding the second matrix to the temporal matrix resulting in the cross-temporal matrix.

10. The method of claim 1, wherein computing the global video rank for each of the plurality of videos comprises applying a ranking method, a page rank method, graph nearest neighbor method, and clustering method to the cross-temporal matrix.

11. The method of claim 1, wherein generating the similarity score corresponding to each pair of videos in the plurality of videos comprises:
    extracting keywords for each of the plurality of videos from the meta-data;
    determining number of similar keywords corresponding to each pair of videos;
    determining a first value for each pair of videos;
    dividing the number of similar keywords corresponding to each pair of videos by the corresponding first value resulting in a corresponding similarity score.

12. The method of claim 11, wherein determining the first value for each pair of videos comprises;
    determining number of keywords for a first video in a pair of videos;
    determining number of keywords for a second video in the pair of videos;
    multiplying the number of keywords for the first video and the number of keywords for the second video to determine a product value; and
    determining a square root of the product value.

13. The method of claim 1, wherein the local video rank is determined in accordance with the expression:

$$R_{ij} = C_{ij}\Pi_{\infty j} + \epsilon \rho^{S_{ij}}$$

wherein i varies from 1 to n, j varies from 1 to n, $C_{ij}$ is an entry in a cross-usage matrix for a video i having an outgoing traffic link to a video j, $\Pi_{\infty j}$ is a global video rank for the video j, $\epsilon$ is a binary value, $\rho$ is a scalar greater than 1, and $S_{ij}$ is a similarity score for a pair of videos i and j.

14. The method of claim 1, further comprising generating a video recommendation list based upon the local video rank for each of the plurality of videos relative to another video in the plurality of videos.

15. A system for recommending videos, comprising:
    a plurality of workstations operationally coupled with a network, and configured to display videos and video recommendations to end users;
    a plurality of processing subsystems operationally coupled with the plurality of workstations via the network, wherein each of the plurality of processing subsystems is configured to:
      generate, by the processing subsystem, a cross-usage matrix based upon data of video sessions of a plurality of videos;
      generate, by the processing subsystem, a temporal matrix based upon release dates of the plurality of videos;
      generate, by the processing subsystem, a cross-temporal matrix based upon the cross-usage matrix and the temporal matrix;
      compute, by the processing subsystem, a global video rank for each of the plurality of videos based upon the cross-temporal matrix;

generate, by the processing subsystem, a similarity score corresponding to a pair of videos in the plurality of videos based upon meta-data of the plurality of videos;

generate, by the processing subsystem, a local video rank for a video of the plurality of videos relative to another video in the plurality of videos based upon the generated cross-usage matrix, the computed global video rank and the generated similarity score; and recommend, by the processing subsystem, a video to a user device based upon the local video rank.

16. The system of claim 15, wherein the network comprises a satellite network, a local area network, a wide area network, a private network, a wired network, a wireless network, the Internet, or combinations thereof.

* * * * *